United States Patent [19]

Frame

[11] 4,203,827
[45] May 20, 1980

[54] PROCESS FOR TREATING SOUR PETROLEUM DISTILLATES

[75] Inventor: Robert R. Frame, Glenview, Ill.

[73] Assignee: UOP Inc., Des Plaines, Ill.

[21] Appl. No.: 940,041

[22] Filed: Aug. 28, 1978

[51] Int. Cl.$^2$ .............................................. C10G 27/06
[52] U.S. Cl. .................................................. 208/206
[58] Field of Search ................................ 208/206, 207

[56] References Cited

U.S. PATENT DOCUMENTS

| 2,744,854 | 5/1956 | Urban, Jr. ............................ | 208/206 |
| 3,108,081 | 10/1963 | Gleim et al. ......................... | 208/206 |
| 4,070,271 | 1/1978 | Carlson et al. ...................... | 208/206 |

*Primary Examiner*—George Crasanakis
*Attorney, Agent, or Firm*—James R. Hoatson, Jr.; Thomas K. McBride; William H. Page, II

[57] ABSTRACT

A process for treating a mercaptan-containing sour petroleum distillate is disclosed. A sour petroleum distillate, in admixture with an oxidizing agent, is passed into contact with a catalytic composite in the presence of an alkaline reagent, said catalytic composite comprising a metal chelate mercaptan oxidation catalyst and a quaternary ammonium compound impregnated on a solid adsorbent support disposed as a fixed bed in a first treating zone. The effluent from said first zone, in admixture with an oxidizing agent, is then passed into contact with a catalytic composite in the presence of an alkaline reagent, said catalytic composite comprising a metal chelate mercaptan oxidation catalyst impregnated on a solid adsorbent support disposed as a fixed bed in a second treating zone. A petroleum distillate, substantially free of mercaptan sulfur, is recovered from the second treating zone.

16 Claims, No Drawings

PROCESS FOR TREATING SOUR PETROLEUM DISTILLATES

This invention relates to a process particularly adapted to the conversion of difficultly oxidizable mercaptans contained in a sour petroleum distillate. Processes for the treatment of sour petroleum distillates, wherein the distillate is treated in contact with an oxidation catalyst in the presence of an oxidizing agent at alkaline reaction conditions, have become well known and widely practiced in the petroleum refining industry. Said processes are typically designed to effect the oxidation of offensive mercaptans contained in a sour petroleum distillate with the formation of innocuous disulfides—a process commonly referred to as sweetening. Depending on the source of the petroleum from which the sour distillate was derived, the boiling range of the distillate itself, and possibly the method of processing the petroleum to produce the distillate, the distillates vary widely with respect to the concentration, molecular weight and complexity of the mercaptans contained therein, and the sweetening process will vary accordingly.

One such process relates to olefin-containing petroleum distillates. When said distillates are required to be maintained in storge for any length of time, they advantageously contain an oxidation inhibitor to obviate gum formation. The inhibitor is typically an oil-soluble phenylenediamine. When the olefin-containing distillates further contain a relatively small concentration of the more readily oxidizable mercaptans, the phenylenediamine acts as a homogeneous oxygen transfer agent, and, in the presence of an alkaline reagent, promotes the oxidation of mercaptans and the formation of disulfides. It is to be noted that at least one-third of the mercaptans are consumed by interaction with the olefin content of the distillate. The process is commonly referred to as inhibitor sweetening. The homogeneous phenylenediamine is not recoverable but is expended in the sweetening process, and as the amount of the phenylenediamine required to effect an economical rate of oxidation becomes excessive, the process becomes ineffective as a sweetening process and resort must be had to other means. It is known that inhibitor sweetening, which is essentially a batch type of process more suited to the treatment of sour distillates in storage, functions only with respect to olefin-containing distillates—the olefin being essential to the inhibitor sweetening process. Over a period of time, usually measured in hours or days, the stored distillate may become doctor sweet depending on the complexity and concentration of the mercaptans contained therein. While certain quaternary ammonium compounds have been used in conjunction with the homogeneous phenylenediamine catalyst to accelerate the sweetening process as shown in U.S. Pat. No. 3,164,544, the process remains subject to the general limitations of inhibitor sweetening. Thus, inhibitor sweetening is generally ineffective with respect to sour petroleum distillates containing mercaptans other than primary and secondary mercaptans, and increasingly ineffective with respect to petroleum distillates containing in excess of about 150 ppm. mercaptan sulfur.

Sour petroleum distillates that do not respond to inhibitor sweetening, i.e., those containing the higher molecular weight and/or more complex mercaptans, or higher mercaptan concentrations, are commonly treated in contact with a heterogeneous metal phthalocyanine catalyst dispersed in an aqueous caustic solution to yield a doctor sweet product. The sour petroleum distillate and the catalyst-containing aqueous caustic solution provide a liquid-liquid system wherein mercaptans are converted to disulfides at the interface of the immiscible solutions in the presence of an oxidizing agent—usually air. This liquid-liquid system is invariably employed in a continuous type of operation requiring a substantially lesser contact time than required of inhibitor sweetening. The metal phthalocyanine catalyst, which is recovered and recycled for continuous use, is not limited to use in conjunction with an olefin-containing petroleum distillate, but is equally effective with regard to olefin-free distillates to provide a doctor-sweet product.

Certain of the higher boiling sour petroleum distillates, generally boiling in excess of about 275° F., contain highly hindered branched chain and aromatic thiols, and/or higher molecular weight tertiary and polyfunctional mercaptans, which are at most only partially soluble in the catalyst-containing caustic solution of the liquid-liquid treating system. Sour petroleum distillates containing these more difficultly oxidizable mercaptans are more effectively treated in contact with a metal phthalocyanine catalyst disposed or impregnated on a high surface area adsorptive support or carrier material—usually an activated charcoal. The distillate is treated in contact with the supported metal phthalocyanine catalyst at oxidation conditions in the presence of an alkaline reagent. One such process is described in U.S. Pat. No. 2,988,500. The oxidizing agent is most often air admixed with the distillate to be treated, and the alkaline reagent is most often an aqueous caustic solution charged continuously to the process or intermittently as required to maintain the catalyst in a caustic-wetted state.

It is an object of this invention to present a novel process particularly useful in the treatment of sour petroleum distillates containing the more difficultly oxidizable mercaptans.

In one of its broad aspects, the present invention embodies a process which comprises passing a mercaptan-containing sour petroleum distillate in admixture with an oxidizing agent into contact with a catalytic composite in the presence of an alkaline reagent, said catalytic composite comprising a metal chelate mercaptan oxidation catalyst and a quaternary ammonium compound impregnated on a solid adsorbent support disposed as a fixed bed in a first treating zone; passing the effluent from said first treating zone in admixture with an oxidizing agent into contact with a catalytic composite in the presence of an alkaline reagent, said catalytic composite comprising a metal chelate mercaptan oxidation catalyst impregnated on a solid adsorbent support disposed as a fixed bed in a second treating zone; and recovering a petroleum distillate product substantially free of mercaptan sulfur.

One of the more specific embodiments concerns a process which comprises passing a mercaptan-containing sour petroleum distillate in admixture with an oxidizing agent into contact with a catalytic composite in the presence of an alkaline reagent, said catalytic composite comprising a metal phthalocyanine and a benzyl-dimethylalkylammonium hydroxide or chloride impregnated on a charcoal support disposed as a fixed bed in a first treating zone; passing the effluent from said first treating zone in admixture with an oxidizing agent into contact with a catalytic composite in the presence of an alkaline reagent, said catalytic composite comprising a metal phthalocyanine impregnated on a charcoal support disposed as a fixed bed in a second treating zone; and recovering a distillate product substantially free of mercaptan sulfur.

In a still more specific embodiment of this invention, the catalytic composite of the first treating zone comprises from about 0.1 to about 10 wt. % cobalt phthalocyanine monosulfonate and from about 1 to about 50 wt. % benzyldimethylalkylammonium chloride or hydroxide impregnated on an activated charcoal support, the alkyl substituent of said benzyldimethylalkylammonium compound being a substantially straight chain alkyl radical containing from about 12 to about 18 carbon atoms, and the catalytic composite of the second treating zone comprises from about 0.1 to about 10 wt. % cobalt phthalocyanine monosulfonate impregnated on an activated charcoal support.

Other objects and embodiments of this invention will become apparent in the following detailed specification.

The mercaptan oxidation catalyst utilized as a component of the catalytic composite employed in the first treating zone, and also as a component of the catalytic composite employed in the second treating zone, can be any of the various mercaptan oxidation catalysts known to the treating art as effective to catalyze the oxidation of mercaptans contained in a sour petroleum distillate with the formation of polysulfide oxidation products. Said catalysts include the metal compounds of tetrapyridinoporphyrazine described in U.S. Pat. No. 3,980,582, e.g., cobalt tetrapyridinoporphyrazine; porphyrin and metaloporphyrin catalysts as described in U.S. Pat. No. 2,966,453, e.g., cobalt tetraphenylporphyrin sulfonate; corrinoid catalysts as described in U.S. Pat. No. 3,252,892, e.g., cobalt corrin sulfonate; chelate organometallic catalysts such as described in U.S. Pat. No. 2,918,426, e.g., the condensation product of an aminophenol and a metal of Group VIII; and the like. Metal phthalocyanines are a preferred class of mercaptan oxidation catalysts.

The metal phthalocyanines employed as a mercaptan oxidation catalyst generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine and the like. Cobalt phthalocyanine and vanadium phthalocyanine are particularly preferred. The metal phthalocyanine is most frequently employed as a derivative thereof, the commercially available sulfonated derivatives, e.g., cobalt phthalocyanine monosulfonate, cobalt phthalocyanine disulfonate, or a mixture thereof, being particularly preferred. The sulfonated derivatives may be prepared, e.g., by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The quaternary ammonium compounds herein contemplated as a component of the catalytic composite employed in the first treating zone include such as tetramethylammonium hydroxide, tetraethylammonium hydroxide, tetrapropylammonium hydroxide, tetrabutylammonium hydroxide, trimethylethylammonium hydroxide, tetrabutylammonium hydroxide, trimethylethylammonium hydroxide, trimethylpropylammonium hydroxide, trimethylbutylammonium hydroxide, dimethyldiethylammonium hydroxide, dimethyldipropylammonium hydroxide, dimethyldibutylammonium hydroxide, methyltriethylammonium hydroxide, methyltripropylammonium hydroxide, methyltributylammonium hydroxide, phenyltrimethylammonium hydroxide, phenyltriethylammonium hydroxide, phenyltripropylammonium hydroxide, phenyltributylammonium hydroxide, benzyltrimethylammonium hydroxide, benzyltriethylammonium hydroxide, benzyltripropylammonium hydroxide, benzyltributylammonium hydroxide, diphenyldimethylammonium hydroxide, diphenyldiethylammonium hydroxide, diphenyldipropylammonium hydroxide, diphenyldibutylammonium hydroxide, dibenzyldimethylammonium hydroxide, dibenzyldiethylammonium hydroxide, dibenzyldipropylammonium hydroxide, dibenzyldibutylammonium hydroxide, triphenylmethylammonium hydroxide, triphenylethylammonium hydroxide, triphenylpropylammonium hydroxide, triphenylbutylammonium hydroxide, and the like.

A preferred class of quaternary ammonium compounds is represented by the structural formula

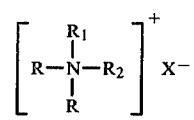

wherein R is a hydrocarbon radical containing up to about 20 carbon atoms and selected from the group consisting of alkyl, cycloalkyl, aryl, alkaryl and aralkyl, $R_1$ is a substantially straight chain alkyl radical containing from about 5 to about 20 carbon atoms, $R_2$ is selected from the group consisting of aryl, alkaryl and aralkyl, and X is an anion, for example, chloride, hydroxide, nitrate, nitrite, sulfate, phosphate, acetate, citrate, tartrate, and the like. $R_1$ is preferably an alkyl radical containing from about 12 to about 18 carbon atoms, $R_2$ is preferably benzyl, and X is preferably chloride and/or hydroxide. Preferred quaternary ammonium compounds thus include benzyldimethyldodecylammonium chloride, benzyldimethyltetradecylammonium chloride, benzyldimethylhexadecylammonium chloride, benzyldimethyloctadecylammonium chloride, and the like. Other suitable quaternary ammonium compounds include phenyldimethylpentylammonium chloride, phenyldiethylpentylammonium chloride, phenyldipropylpentylammonium chloride, phenyldimethylhexylammonium chloride, phenyldiethylhexylammonium chloride, phenyldipropylhexylammonium chloride, phenyldimethyloctylammonium chloride, phenyldiethyloctylammonium chloride, phenyldipropyloctylammonium chloride, phenyldimethyldecylammonium chloride, phenyldiethyldecylammonium chloride, phenyldipropyldecylammonium chloride, phenyldimethyldodecylammonium chloride, phenyldiethyldodecylammonium chloride, phenyldipropyldodecylammonium chloride, phenyldimethyltetradecylammonium chloride, phenyldiethyltetradecylammonium chloride, phenyldipropyltetradecylammonium chloride, phenyldimethylhexadecylammonium chloride, phenyldiethylhexadecylammonium chloride, phenyldipropylhexadecylammonium chloride, phenyldimethyloctadecylammonium chloride, phenyldiethyloctadecylammonium chloride, phenyldipropyloctadecylammonium chloride, phenyldimethyleicosylammonium chloride, phenyldiethyleicosylammonium chloride, phenyldipropyleicosylammonium chloride, naphthyldimethylpentylammonium chloride, naphthyldiethylpentylammonium chloride, naphthyldipropylpentylammonium chloride, naphthyldimethylhexylammonium chloride, dinaphthyldiethylhexylammonium chloride, naphthyldipropylhexylammonium chloride, naphthyldimethyloctylammonium chloride, naphthyldiethyloctylammonium chloride, naphthyldipropyloctylammonium chloride, naphthyldimethyldecylammonium chloride, naphthyldiethyldecylammonium chloride, naphthyldipropyldecylammonium chloride, naphthyldimethyldodecylammonium chloride, naphthyldiethyldodecylammonium chloride, naphthyldipropyldodecylammonium chloride, naphthyldimethyltetradecylammonium chloride, naphthyldiethyltetradecylammonium chloride, naphthyldipropyltetradecylammonium chloride, naphthyldimethylhexadecylammonium chloride, naphthyldiethylhexadecylammonium chloride, naphthyldipropylhexadecylammonium chloride, naphthyldimethyloctadecylammonium chloride, naphthyldiethyloctadecylammonium chloride, naphthyldipropyloctadecylammonium chloride, benzyldimethylpentylammonium chloride, benzyldiethylpentylammonium chloride, benzyldipropylpentylammonium chloride, benzyldimethylhexylammonium chloride, benzyldiethylhexylammonium chloride, benzyldipropylhexylammonium chloride, benzyldimethyloctylammonium chloride, benzyldiethyloctylammonium chloride, benzyldipropyloctylammonium chloride, benzyldimethyldecylammonium chloride, benzyldiethyldecylammonium chloride, benzyldipropyldecylammonium chloride, benzyldiethyldodecylammonium chloride, benzyldipropyldodecylammonium chloride, benzyldiethyltetradecylammonium chloride, benzyldipropyltetradecylammonium chloride, benzyldiethylhexadecylammonium chloride, benzyldipropylhexadecylammonium chloride, benzyldiethyloctadecylammonium chloride, benzyldipropyloctadecylammonium chloride, benzyldimethyleicosylammonium chloride, benzyldiethyleicosylammonium chloride, benzyldipropyleicosylammonium chloride, tolyldimethylpentylammonium chloride, tolyldiethylpentylammonium chloride, tolyldipropylpentylammonium chloride, tolyldimethylhexylammonium chloride, tolyldiethylhexylammonium chloride, tolyldipropylhexylammonium chloride, tolyldimethyloctylammonium chloride, tolyldiethyloctylammonium chloride, tolyldipropyloctylammonium chloride, tolyldimethyldecylammonium chloride, tolyldiethyldecylammonium chloride, tolyldipropyldecylammonium chloride, tolyldimethyldodecylammonium chloride, tolyldiethyldodecylammonium chloride, tolyldipropyldodecylammonium chloride, tolyldimethyltetradecylammonium chloride, tolyldiethyltetradecylammonium chloride, tolyldipropyltetradecylammonium chloride, tolyldimethylhexadecylammonium chloride, tolyldiethylhexadecylammonium chloride, tolyldipropylhexadecylammonium chloride, tolyldimethyloctadecylammonium chloride, tolyldiethyloctadecylammonium chloride, tolyldipropyloctadecylammonium chloride, tolyldimethyleicosylammonium chloride, tolyldiethyleicosylammonium chloride, tolyldipropyleicosylammonium chloride, diphenylmethylpentylammonium chloride, diphenylethylpentylammonium chloride, diphenylpropylpentylammonium chloride, diphenylmethylhexylammonium chloride, diphenylethylhexylammonium chloride, diphenylpropylhexylammonium chloride, diphenylmethyloctylammonium chloride, diphenylethyloctylammonium chloride, diphenylpropyloctylammonium chloride, diphenylmethyldecylammonium chloride, diphenylethyldecylammonium chloride, diphenylpropyldecylammonium chloride, diphenylmethyldodecylammonium chloride, diphenylethyldodecylammonium chloride, diphenylpropyldodecylammonium chloride, diphenylmethyltetradecylammonium chloride, diphenylethyltetradecylammonium chloride, diphenylpropyltetradecylammonium chloride, diphenylmethylhexadecylammonium chloride, diphenylethylhexadecylammonium chloride, diphenylpropylhexadecylammonium chloride, diphenylmethyloctadecylammonium chloride, diphenylethyloctadecylammonium chloride, diphenylpropyloctadecylammonium chloride, diphenylmethyleicosylammonium chloride, diphenylethyleicosylammonium chloride, diphenylpropyleicosylammonium chloride, as well as the corresponding fluoride, bromide, iodide, hydroxide, sulfate, nitrate, nitrite, phosphate, acetate, citrate and tartrate compounds.

The solid adsorbent support or carrier material employed herein can be any of the well-known solid adsorbent materials generally utilized as a catalyst support or carrier material. Preferred adsorbent materials include the various charcoals produced by the destructive distillation of wood, peat, lignite, nutshells, bones, and other carbonaceous matter, and preferably such charcoals as have been heat treated or chemically treated or both, to form a highly porous particle structure of increased adsorbent capacity, and generally defined as activated carbon or charcoal. Said adsorbent materials also include the naturally occurring clays and silicates, e.g., diatomaceous earth, fuller's earth, kieselguhr, attapulgus clay, feldspar, montmorillonite, halloysite, kaolin, and the like, and also the naturally occurring or synthetically prepared refractory inorganic oxides such as alumina, silica, zirconia, thoria, boria, etc. or combinations thereof like silica-alumina, silica-zirconia, alumina-zirconia, etc. Any particular solid adsorbent material is selected with regard to its stability under conditions of its intended use. For example, in the treatment of a sour petroleum distillate heretofore described, the solid adsorbent carrier material should be insoluble in, and otherwise inert to, the petroleum distillate at the alkaline reaction conditions existing in the treating zone. In the latter case, charcoal, and particularly, activated charcoal, is preferred because of its capacity for the quaternary ammonium compounds of this invention as well as metal phthalocyanine, and because of its stability under treating conditions.

The mercaptan oxidation catalyst, particularly the metal phthalocyanines, as well as the quaternary ammonium compound, are readily adsorbed and impregnated on the solid adsorbent support to produce the catalytic composite employed as a fixed bed in the first treating zone. The quaternary ammonium compound may comprise up to about 50 wt. % or more of the catalytic composite. In the sweetening process herein contemplated, the quaternary ammonium salt will suitably comprise from about 1 to about 50 wt. %, and preferably from about 5 to about 35 wt. % of the said composite. In general, up to about 25 wt. % metal phthalocyanine can be adsorbed on the solid adsorbent support and still form a stable catalytic composite. A lesser amount in the range of from about 0.1 to about 10 wt. % will generally be preferred.

The quaternary ammonium compound and the metal chelate components can be impregnated on the solid adsorbent support in any conventional or otherwise convenient manner, and said components can be impregnated on said support simultaneously from a common aqueous or alcoholic solution and/or dispersion thereof, or separately and in any desired sequence. The impregnation process can be effected utilizing conventional techniques whereby the support in the form of spheres, pills, pellets, granules or other particles of uniform or irregular size or shape, is soaked, suspended, dipped one or more times, or otherwise immersed in an aqueous or alcoholic impregnating solution and/or dispersion to adsorb a given quantity of the ammonium salt and metal chelate components thereon. One preferred method involves the use of a steam-jacketed rotary dryer. The adsorbent support is immersed in the impregnating solution and/or dispersion contained in the dryer and the support is tumbled therein by the rotating motion of the dryer. Evaporation of the solution in contact with the tumbling support is expedited by applying steam to the dryer jacket. In any case, the resulting composite is allowed to dry under ambient temperature conditions, or dried at an elevated temperature in an oven, or in a flow of hot gases, or in any other suitable manner.

The catalytic composite employed in the second treating zone may comprise the same or different metal chelate component, and in substantially the same concentration, as described with respect to the catalytic composite employed in the first treating zone. The metal chelate can be impregnated in the solid adsorbent support in substantially the same manner, excluding the quaternary ammonium compound.

In the practice of this invention, the first mentioned catalytic composite can be disposed as a fixed bed in a first treating zone immediately above the last mentioned catalytic composite disposed as a fixed bed in a second treating zone of common treating column. Alternatively, the first treating zone may be established in a separate treating column with the second treating zone being situated in a treating column downstream of the first. In this manner, any of the quaternary ammonium compound which may become washed or leached from the catalytic composite disposed as a fixed bed in the first treating zone, particularly during the start-up and subsequent line-out phase of the treating process, is readsorbed in the catalytic composite of the second treating zone to optimize the improved activity and stability afforded by the quaternary ammonium compounds herein contemplated. In some cases, it may be desirable to include a spent or partially spent mercaptan oxidation catalyst in the second treating zone, in which case, the catalyst will suffer at least some degree of reactivation on adsorption of any residual quaternary ammonium compound from the first treating zone which might otherwise be entrained and lost in the distillate product stream.

In the process of sweetening a sour petroleum distillate, it has heretofore been the practice to oxidize the mercaptans contained therein in the presence of an alkaline reagent. A supported mercaptan oxidation catalyst is typically initially saturated with the alkaline reagent, and the alkaline reagent thereafter passed in contact with the catalyst bed, continuously or intermittently as required, admixed with the sour petroleum distillate. Any suitable alkaline reagent may be employed. An alkali metal hydroxide in aqueous solution, e.g., sodium hydroxide in aqueous solution, is most often employed. The solution may further comprise a solubilizer to promote mercaptan solubility, e.g., alcohol, and especially methanol, ethanol, n-propanol, isopropanol, etc., and also phenols, cresols, and the like. A particularly preferred alkaline reagent is an aqueous caustic solution comprising from about 2 to about 30 wt. % sodium hydroxide. The solubilizer, when employed, is preferably methanol, and the alkaline solution may suitably comprise from about 2 to about 100 vol. % thereof. Sodium hydroxide and potassium hydroxide constitute the preferred alkaline reagents, others including lithium hydroxide, rubidium hydroxide and cesium hydroxide are also suitably employed.

The process of this invention can be effected in accordance with prior art treating conditions. The process is usually effected at ambient temperature conditions, although higher temperatures up to about 105° C. are suitably employed. Pressures of up to about 1,000 psi or more are operable, although atmospheric or substantially atmospheric pressures are entirely suitable. Contact times equivalent to a liquid hourly space velocity of from about 0.5 to about 10 or more are effective to achieve a desired reduction in the mercaptan content of a sour petroleum distillate, an optimum contact time being dependent on the size of the treating zone, the quantity of catalyst contained therein, and the character of the distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing gas may be employed. The sour petroleum distillate may be passed upwardly or downwardly through the catalyst bed. The sour petroleum distillate may contain sufficient entrained air, but generally added air is admixed with the distillate and charged to the treating zone concurrently therewith. In some cases, it may be of advantage to charge the air separately to the treating zone and countercurrent to the distillate separately charged thereto.

The catalytic composites of this invention are both active and stable. Accordingly, the composites can be used in a fixed bed to treat large volumes of sour petroleum distillates, especially those distillates containing the more difficultly oxidizable mercaptans. As heretofore mentioned, the quaternary ammonium compound and metal phthalocyanine components of the catalytic composite disposed as a fixed bed in the first treating zone are readily adsorbed on the solid adsorbent support component thereof. Thus, any of the said quaternary ammonium compound or metal phthalocyanine components which may in time be leached from the support can be easily restored to the catalytic composite in situ by introducing either or both of said components to the sweetening process, for example, in admixture with the alkaline reagent to be adsorbed on the solid adsorbent support in the treating zone.

The following example is presented in illustration of one preferred embodiment of this invention and is not intended as an undue limitation on the generally broad scope of the invention as set out in the appended claims.

EXAMPLE

The sour petroleum distillate of this example was a kerosene fraction boiling in a 352°–425° F. range at 742 mm, and containing 448 ppm. mercaptan sulfur. The kerosene was charged downflow through 100 cc of a charcoal-supported cobalt phthalocyanine-quaternary ammonium compound catalyst disposed as a fixed bed in a vertical tubular reactor immediately above 100 cc of a charcoal-supported cobalt phthalocyanine catalyst disposed as a fixed bed in said reactor.

In the preparation of the first mentioned catalyst, 10×30 mesh activated charcoal particles were impregnated with an aqueous solution or dispersion of cobalt phthalocyanine monosulfonate and benzyldimethylalkylammonium chloride. The benzyldimethylalkylammonium chloride was a mixture of benzyldimethyldodecylammonium, benzyldimethyltetradecylammonium, benzyldimethylhexadecylammonium and benzyldimethyloctadecylammonium chlorides. The impregnating solution or dispersion was formulated by the addition of sufficient cobalt phthalocyanine monosulfonate and benzyldimethylalkylammonium chloride to deionized water to provide 0.3 gms. of the phthalocyanine and 4.5 gms. of the quaternary ammonium compound per 100 cc of the activated charcoal particles. The quaternary ammonium compound employed was a 50 percent alcoholic solution thereof. The charcoal particles were immersed in the solution or dispersion in a rotary steam evaporator and tumbled therein for about 1 hour. Steam was thereafter applied to the evaporator jacket and the solution was evaporated to dryness in contact with the tumbling charcoal particles.

The second mentioned catalyst was prepared substantially as described except that the quaternary ammonium compound was omitted.

The kerosene was charged at a liquid hourly space velocity of 0.5 under 35 psig. air pressure—sufficient to provide about 1.5 times the stoichiometric amount of oxygen required to oxidize the mercaptans contained in the kerosene. The catalyst beds were initially wetted with about 100 cc of an 8 percent aqueous sodium hydroxide solution, 10 cc of said solution being subsequently charged to the beds at 12 hour intervals admixed with the kerosene charged thereto. The treated kerosene recovered from the lower bed was analyzed periodically for mercaptan sulfur.

I claim as my invention:

1. A process for treating a mercaptancontaining sour petroleum distillate which comprises:
   (a) passing said distillate in admixture with an oxidizing agent and an aqueous solution of an alkali metal hydroxide into contact with a catalytic composite consisting essentially of a metal phthalocyanine mercaptan oxidation catalyst and a quaternary ammonium compound impregnated on a solid adsorbent support disposed as a fixed bed in a first treating zone;
   (b) passing the effluent comprising said distillate and said aqueous solution of alkali metal hydroxide from said first treating zone in admixture with an oxidizing agent into contact with a catalytic composite, said catalytic composite comprising a metal phthalocyanine mercaptan oxidation catalyst impregnated on a solid adsorbent support disposed as a fixed bed in a second treating zone; and
   (c) recovering a petroleum distillate product substantially free of mercaptan sulfur.

2. The process of claim 1 further characterized in that said metal phthalocyanine mercaptan oxidation catalyst is a cobalt phthalocyanine.

3. The process of claim 1 further characterized in that said metal phthalocyanine mercaptan oxidation catalyst is cobalt phthalocyanine monosulfonate.

4. The process of claim 1 further characterized in that said metal chelate mercaptan oxidation catalyst is a metal phthalocyanine comprising from about 0.1 to about 10 wt. % of the catalytic composite of Step (a) and of Step (b).

5. The process of claim 1 further characterized in that said metal phthalocyanine comprises from about 0.1 to about 2.0 wt. % of the catalytic composite of Step (a) and of Step (b).

6. The process of claim 1 further characterized with respect to Step (a) in that said quaternary ammonium compound is represented by the structural formula

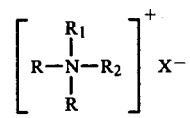

wherein R is a hydrocarbon radical containing up to about 20 carbon atoms and selected from the group consisting of alkyl, cycloalkyl, aryl, alkaryl, and aralkyl, $R_1$ is a substantially straight chain alkyl radical containing from about 5 to about 20 carbon atoms, $R_2$ is selected from a group consisting of aryl, aralkyl and alkaryl, and X is an anion.

7. The process of claim 1 further characterized with respect to Step (a) in that said quaternary ammonium compound is a benzyldimethylalkylammonium hydroxide wherein the alkyl substituent is a substantially straight chain alkyl radical containing from about 5 to about 20 carbon atoms.

8. The process of claim 1 further characterized with respect to Step (a) in that said quaternary ammonium compound is a benzyldimethylalkylammonium hydroxide wherein the alkyl substituent is a substantially straight chain alkyl radical containing from about 12 to about 18 carbon atoms.

9. The process of claim 1 further characterized with respect to Step (a) in that said quaternary ammonium compound is benzyldimethyldodecylammonium hydroxide.

10. The process of claim 1 further characterized with respect to Step (a) in that said quaternary ammonium compound is benzyldimethyltetradecylammonium hydroxide.

11. The process of claim 1 further characterized with respect to Step (a) in that said quaternary ammonium compound is benzyldimethylhexadecylammonium hydroxide.

12. The process of claim 1 further characterized with respect to Step (a) in that said quaternary ammonium compound is benzyldimethyloctadecylammonium hydroxide.

13. The process of claim 1 further characterized in that said solid adsorbent support of Step (a) and (b) is an activated charcoal.

14. The process of claim 1 further characterized in that said quaternary ammonium compound comprises from about 1 to about 50 wt. % of said catalytic composite of Step (a).

15. The process of claim 1 further characterized in that said quaternary ammonium compound comprises from about 5 to about 35 wt. % of said catalytic composite of Step (a).

16. The process of claim 1 further characterized in that said distillate of Step (a) and said effluent of Step (b) are passed in contact with the catalytic composite of Step (a) and the catalytic composite of Step (b), respectively, at a liquid hourly space velocity of from about 0.1 to about 10.

* * * * *